United States Patent [19]

Thompson

[11] Patent Number: 5,529,622
[45] Date of Patent: Jun. 25, 1996

[54] PROCESS FOR TREATMENT OF CLAY FOR USE AS A PAPER COATING PIGMENT

[75] Inventor: Thomas D. Thompson, Hephzibah, Ga.

[73] Assignee: United Catalysts Inc., Louisville, Ky.

[21] Appl. No.: 419,098

[22] Filed: Apr. 10, 1995

[51] Int. Cl.$^6$ .................................................. C04B 14/10
[52] U.S. Cl. ........................ 106/484; 106/486; 106/286.5; 106/DIG. 4; 501/145; 501/149
[58] Field of Search .................................. 106/484, 486, 106/416, 286.5, DIG. 4; 501/141, 145, 149; 162/181.8

[56] References Cited

U.S. PATENT DOCUMENTS

| | | | |
|---|---|---|---|
| 2,531,427 | 11/1950 | Hauser | 106/487 |
| 2,885,360 | 5/1959 | Haden, Jr. et al. | 252/28 |
| 3,253,791 | 5/1966 | Cohn et al. | 209/4 |
| 3,993,500 | 11/1976 | Isaac et al. | 501/147 |
| 4,018,673 | 4/1977 | Hughes et al. | 501/149 |
| 4,042,412 | 8/1977 | Williams | 501/147 |
| 4,451,440 | 5/1984 | Thompson, III | 501/148 |
| 4,483,934 | 11/1984 | Goodman et al. | 501/145 |
| 4,695,402 | 9/1987 | Finlayson et al. | 106/487 |
| 4,888,315 | 12/1989 | Bowman et al. | 501/144 |
| 5,011,534 | 4/1991 | Berube et al. | 501/144 |
| 5,137,574 | 8/1992 | Suitch et al. | 501/145 |
| 5,266,538 | 11/1993 | Knudson et al. | 106/DIG. 4 |
| 5,371,051 | 12/1994 | Pope et al. | 501/145 |
| 5,391,228 | 2/1995 | Carroll | 106/DIG. 4 |
| 5,407,480 | 4/1995 | Payton et al. | 106/416 |

FOREIGN PATENT DOCUMENTS 283300 9/1988 European Pat. Off. .

OTHER PUBLICATIONS

Technical Bulletin: Abrasion Tester Model AT 1000, pp. 1–11**no date.
"Testing Fillers And Pigments For Paper, Cardboard and Pulpboard", Specification Sheet V/27.5/75, pp. 1–6, Oct. 23, 1975.

Primary Examiner—Anthony Green
Attorney, Agent, or Firm—Scott R. Cox

[57] ABSTRACT

A process is disclosed for the production of a blended smectite clay with enhanced rheology, particle size restriction and reduced abrasion characteristics which is useful for the coating of paper. The process comprises slurrying of a predominantly sodium smectite clay, slurrying a predominantly calcium smectite clay, degritting of the clay slurries to remove coarse grained impurities, removing a substantial portion of the undesirable soluble salts from the clay slurries, fractionating the clay slurries to control particle size of the smectite clays in the slurry and blending together the predominantly sodium smectite clay slurry with the predominantly calcium smectite clay slurry to form a blended clay slurry.

14 Claims, 4 Drawing Sheets

```
┌─────────────────────────────────────────┐
│ SLURRYING A SMECTITE CLAY COMPRISING    │
│    PREDOMINANTLY SODIUM CATIONS         │
└─────────────────────────────────────────┘
                    │
┌─────────────────────────────────────────┐
│ SLURRYING A SMECTITE CLAY COMPRISING    │
│    PREDOMINANTLY CALCIUM CATIONS        │
└─────────────────────────────────────────┘
                    │
     ┌─────────────────────────────┐
     │ DEGRITTING THE CLAY SLURRIES│
     └─────────────────────────────┘
                    │
┌─────────────────────────────────────────┐
│  REMOVING A SUBSTANTIAL PORTION         │
│ OF THE UNDESIRED SOLUBLE SALTS          │
│         FROM THE SLURRIES               │
└─────────────────────────────────────────┘
                    │
┌─────────────────────────────────────────┐
│  FRACTIONATING THE CLAY SLURRIES        │
│      TO CONTROL PARTICLE SIZE           │
└─────────────────────────────────────────┘
                    │
┌─────────────────────────────────────────┐
│  BLENDING THE CLAY SLURRIES TO          │
│  PRODUCE AN IMPROVED CLAY               │
│         SLURRY BLEND                    │
└─────────────────────────────────────────┘
```

FIG.1

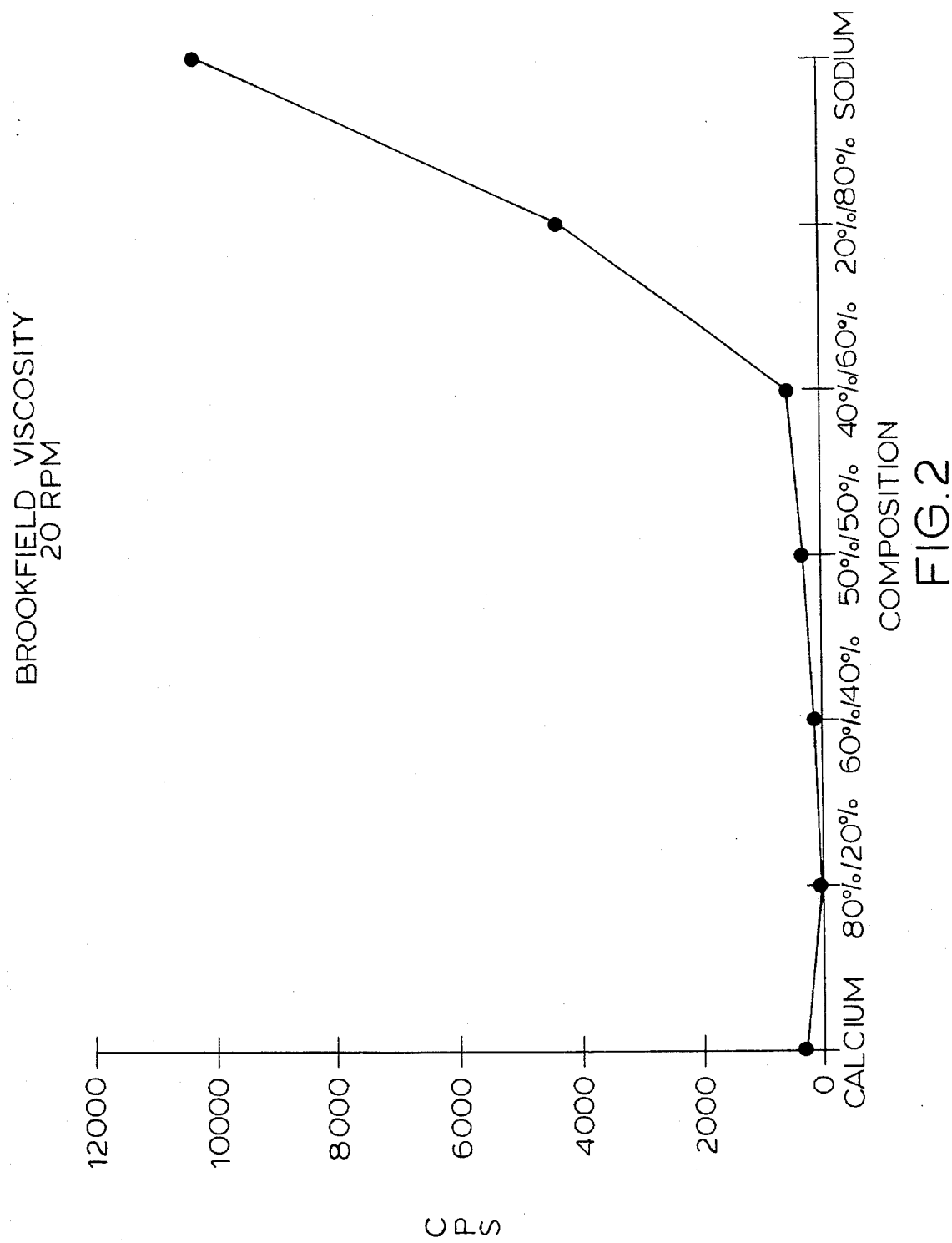

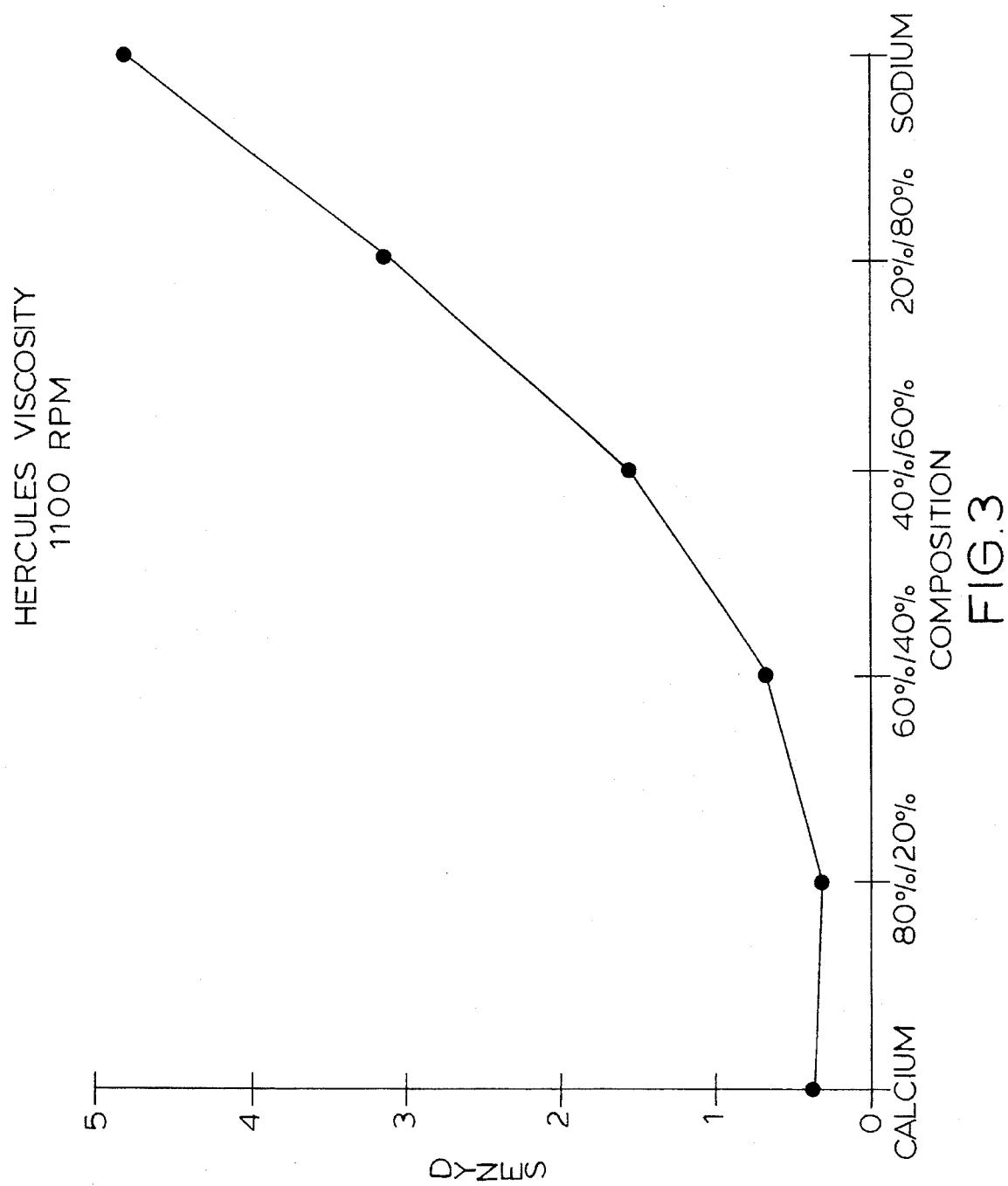

5,529,622

PROCESS FOR TREATMENT OF CLAY FOR USE AS A PAPER COATING PIGMENT

BACKGROUND OF INVENTION

1. Field of Invention

This invention relates to a process for producing improved clays for use in paper coating. More particularly, this invention relates to a process for the treatment of smectite clays for use in the coating of paper which enhances their rheology, particle size distribution and abrasion characteristics.

2. Prior Art

Paper, which is generally a finely intermeshed mix of cellulose fibers, particularly cotton or linen fibers, is not well suited for printing purposes if left untreated because of transparency and irregularities on its surface. These deficiencies are generally corrected by the addition of binding agents, such as starch and resin, and by the incorporation into the fiber stock of various mineral fillers, such as calcium carbonate, calcium sulfate and especially clay. Thus, the quality of ordinary paper is greatly enhanced by coating its surface with a thin film of finely divided clay pigment particles and an adhesive mixture.

The clays used for paper coating are composed preferably of kaolinite or other similar clays. These clays must be produced into as pure as possible form for use in the coating of paper. In addition, it is important that the clays be easily dispersable in water and have exceedingly low viscosity. For best results the clays must yield a slurry of extremely high clay concentration with the lowest possible viscosity.

The use of water swellable smectite clays as a coating pigment for paper, wherein the coating weighs less than 5 g/m, is disclosed in European Patent Application No. 283 300. The preferred clay for use for this coating was a sodium smectite clay. The European application recommends that the natural bentonite be treated through an ion exchange process to convert the clay ions to predominately sodium ions. A method for processing kaolin clay by use of ion exchange resins to remove soluble impurities is disclosed in U.S. Pat. No. 4,451,440.

In the clay industry, crude clays are commonly washed to remove grit that may be present. In addition, raw clay is frequently allowed to stand to permit coarse particles to settle out. See, for example, U.S. Pat. Nos. 2,885,360 and 2,531,427. Additional treatments for clay including fractionation by settling or centrifugation are disclosed, for example, in U.S. Pat. Nos. 3,253,791, 4,018,673 and 4,451,440.

While various processes for the production of sodium smectite clays which are used in the paper coating industry have been disclosed, additional improvements in the processing of swellable clays are necessary to enhance the printing characteristics of the paper. To create these improved characteristics, the smectite-based clays must show improved rheological properties, particle size control and especially, low abrasiveness.

Unfortunately, commonly used sodium smectite clays exhibit high swelling volume, high viscosity and a high degree of thixotropy. These are undesirable properties for paper coating pigments. The variability of smectites with regard to rheology hinders the use of these products in the coating industry under normal operating conditions and has prevented their extensive use as coating pigments in general.

Accordingly, it is an object of this invention to produce improved smectite clay products for use in the coating of paper which exhibits reduced viscosity.

It is a further object of this invention to disclose an improved smectite clay for coating paper which minimizes the adverse thixotropy of natural and synthetic smectites, while still maintaining fine particle size and a high aspect ratio.

It is a still further object of this invention to disclose an improved smectite clay for use in the coating of paper which exhibits a reduction in the abrasiveness of the smectite clay.

It is a still further object of this invention to disclose a smectite clay for use in the coating of paper wherein the particle size of the clay product is carefully controlled.

These and other objects of the invention are obtained by the design of the process disclosed in the instant invention.

SUMMARY OF INVENTION

The instant invention includes a process for the production of bentonite clays for use as a paper coating pigment comprising (a) slurrying a smectite clay wherein predominantly sodium ions are present in its cation site with water to produce a sodium smectite clay slurry, (b) slurrying a smectite clay wherein predominantly calcium ions are present in its cation site with water to produce a calcium smectite clay slurry, (c) degritting each of the clay slurries to remove coarse grain impurities, (d) removing a substantial portion of the undesired soluble salts from each of the clay slurries, (e) fractionating each of the clay slurries to control the particle size of the smectite clays, and (f) blending the sodium smectite clay slurry with the calcium smectite clay slurry to produce an improved clay slurry blend. This improved clay slurry blend can be further processed to produce a clay-based product for use in the paper industry. This further processing may include treating the slurry with water soluble polymers to flocculate the clay, thickening the clay slurry by use of thickening procedures, such as centrifugation, and drying the clay product to produce a powdered clay product.

BRIEF DESCRIPTION OF THE DRAWINGS

FIG. 1 is a schematic drawing of the process of the instant invention.

FIG. 2 is a graph showing the Brookfield viscosity at 20 rpm of various percentage blends of sodium and calcium smectite clays.

FIG. 3 is a graph showing the Hercules viscosity at 1100 rpms of various percentage blends of sodium and calcium smectite clays.

DESCRIPTION OF THE INVENTION

Figure 4:
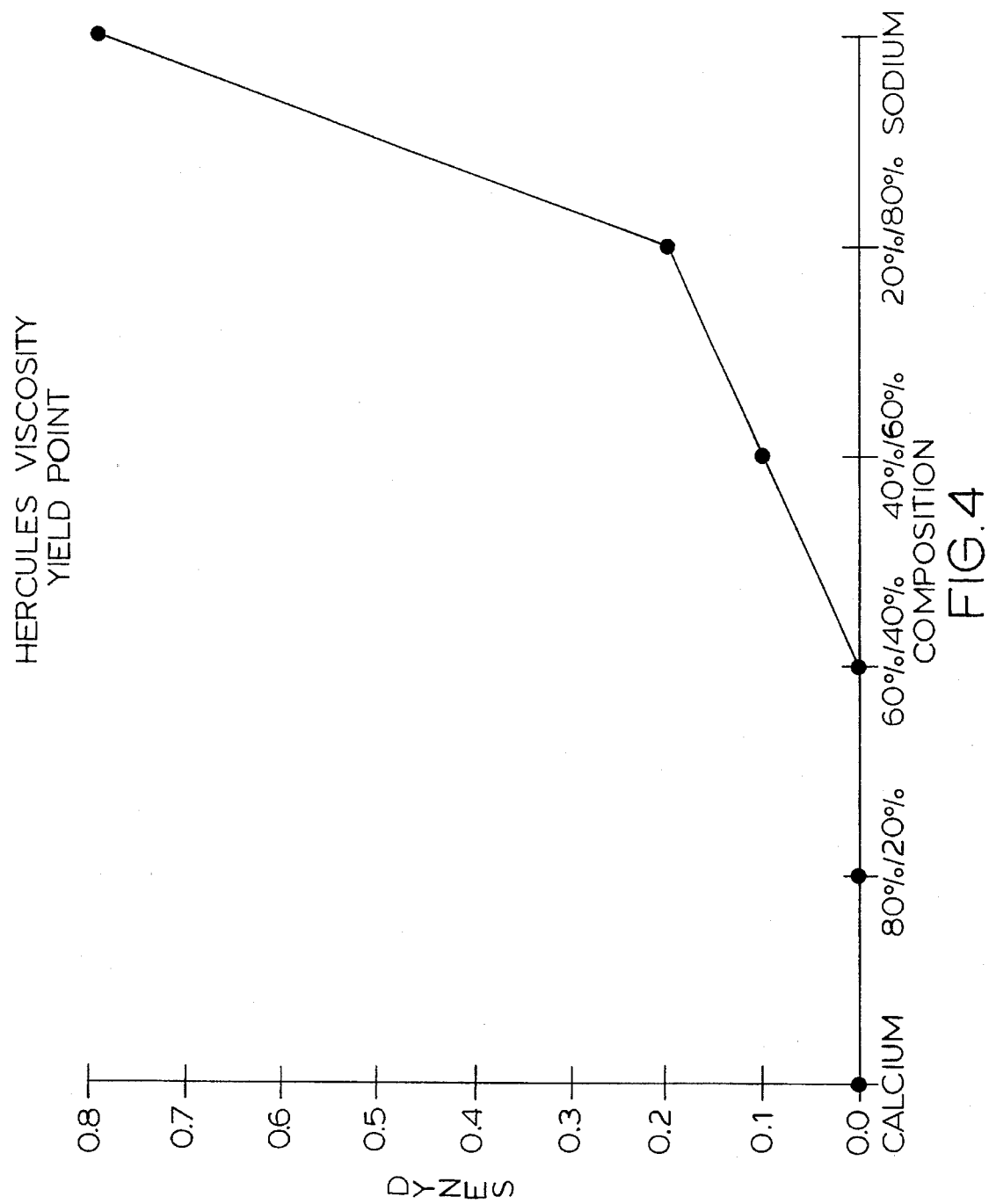
FIG. 4 is a graph showing the yield point of various percentage blends of sodium and calcium smectite clays at various viscosities.

The clay-based coating of this invention, which is used on a printing media, is produced by a process which enhances the rheology, controls the particle size range and reduces the abrasion characteristics of the clay-based coating. The improvement in performance of the smectite clay-based product minimizes the thixotropy of natural or synthetic smectite clays while maintaining fine particle size and a high aspect ratio.

The steps of the process of the instant invention include the following: (1) slurrying sodium-based smectite clay material with water, (2) slurrying calcium-based smectite clay material with water, (3) degritting the clay slurries to remove coarse grained impurities, (4) removing a substantial portion of the soluble salts from the separate clay slurries, (5) fractionating the clay slurries to limit the particle size of the clay particles within the clay slurries, and (6) blending the sodium smectite clay slurry with the calcium smectite clay slurry at various percentages to produce a blended smectite clay product with substantially improved rheological characteristics over clays which are comprised of predominantly calcium or sodium smectite clay. Post treating of the combined clay slurries may also be useful to improve the quality of the product for use in the paper industry.

Clays useful for this process are preferably chosen from the smectite group of clays, such as bentonite, montmorillonite, hectorite, saponite, or nontronite with bentonites being preferable. As will be discussed in more detail, both sodium and calcium bentonites are used for the process. This usage of a predetermined percentage mixture of calcium and sodium bentonite contrasts significantly from prior art processes where the predominant smectite clay used was a sodium smectite. See e.g. U.S. Pat. No. 4,695,402.

The clay, preferably bentonite clay, is first dispersed in water in a conventional procedure to produce a slurry. Preferably the solid content of this slurry will range from about 5 to about 50 percent and more preferably from about 10 to about 30 percent. As previously stated, preferably, separate calcium and sodium smectite clay slurries are produced.

The smectite clay slurries are next treated to remove foreign substances such as sand, feldspar, quartz, calcite and other hard impurities (sometimes referred to as "grit"). This precleaning or degritting of the clay slurries can be carried out by a number of procedures conventional in the industry including grinding, sorting, cyclone separators and other such conventional degritting processes. See e.g. U.S. Pat. Nos. 2,885,360 and 2,531,427. Preferably, the slurry is degritted by use of centrifugation, such as by use of hydrocyclone. Further, centrifugation, using higher g-force, may be useful to remove additional quartz, feldspar and grit impurities from the bentonite clay and thus control the particle size of the clay. Such additional degritting will enhance the quality of the smectite clay end product.

Following the degritting of the clay slurries, the slurries are treated to remove soluble salts. Preferably, soluble salts such as gypsum, epsom salts, sodium sulfate, etc. are removed either by rinsing the clay slurries with deionized water, using dialysis tubing or by the passing of the clay through a mixed bed ion exchange column. See eg. U.S. Pat. No. 4,451,440. This process reduces substantially the viscosity of the smectites, including both sodium and calcium smectites. Soluble salts of sufficient quantity should be removed, such that the resistivity of the clay slurry measured by means of a resistivity meter is no less than about 3,000 ohms. The resistivity of natural bentonites are between about 200 to 600 ohms. The removal of soluble salts enhances significantly the quality of the clay end product by reducing its viscosity and yield point well below that of smectite clay slurries wherein the soluble salts are not removed or are not substantially removed.

Following the removal of the soluble salts, the clay slurries are fractionated to narrow the range of the particle size of the clay particles. Preferably, the fractionation occurs through a centrifugation process. For example, the slurry can be passed through a decanter-type centrifuge, such as is produced by Bird or Sharples or a disc-stack type centrifuge, such as is produced by Alfa Lava, at high enough g-force to effectively fractionate the particles of the clay slurry. In one preferred procedure, the fractionation occurs through use of an International centrifuge at speeds of at least about 500 rpms for at least about 15 minutes. The clay particles separated during these centrifugation process should be in the range of about 85%<0.5 μm to about 99%<0.5 μm and preferably 90%<0.5 μm to about 95%<0.5 μm in size for sodium smectite clay particles and from about 67%<0.5 μm to about 97%<0.5 μm, preferably 75%<0.5 μm to about 90%<0.5 μm for calcium smectite.

Following fractionation, the sodium and calcium clay slurries are blended together to form a blended clay slurry. The blend of sodium and calcium smectites surprisingly results in improved characteristics for the clay end product which are not present if either substantially pure calcium smectite or substantially pure sodium smectite are used. For example, sodium smectite has a higher aspect ratio and surface area than calcium smectites and, therefore, provides better coverage as a base sheet. However, sodium smectites generally have higher viscosity and a high yield point, causing problems of runability in standard coating processes. Calcium smectites have lower viscosity and virtually no yield point which is quite useful for conventional paper coating equipment. While the sodium and calcium bentonite clay slurries preferably should be kept separate prior to their combination, in an alternative embodiment, mixtures of sodium and calcium bentonite clay slurries can be utilized as long as the preferred ratios between the sodium and calcium smectite clays is maintained.

It has been surprisingly discovered that a mixture of calcium and sodium smectite clays significantly reduces the viscosity of the blend over non-blended calcium or sodium smectite slurries. In addition, calcium/sodium smectite blends retain the favorable characteristics of the separate calcium and sodium smectite clay slurries. The blended calcium and sodium smectite may contain from about 20 to about 90 percent calcium smectite and from about 10 to about 80 percent sodium smectite by weight. Preferably the mixed slurry should contain at least about 40 percent calcium smectite by weight and at least about 10 percent sodium smectite by weight in the blend. Most preferably the slurry should contain at least about 60 percent calcium smectite by weight and at least about 40 percent by weight sodium smectite. When blended slurries of calcium and sodium smectite are produced, enhanced viscosities are present in the mixture. For example, when the viscosity is measured at 20 rpm, the viscosity is no more than about 4,000 cps. at 10 percent solids content by weight. When the viscosity is measured at about 1,100 rpm, the viscosity is no more than about 4.0 dynes at 10 percent solids by weight.

The calcium and sodium smectites can be blended by any conventional blending procedure such as by merely combining the slurries. Preferably, the slurries are blended for at least about 15 minutes by use of conventional blending apparatus, such as a mixer, homogenizer or other such blending equipment.

Once the calcium and sodium smectite clays have been blended, posttreatment of the blend is preferred to create the types of products useful in the paper making industry. However, if desired, the sodium and calcium clay blends can be retained in slurry form and shipped for use as a slurry. Alternatively, the percentage of the clay in the slurry can be increased or decreased as needed by the addition of water to lower the percentage of the clay or by drying the slurry to reduce the percentage of water in the clay slurry. If a solid end product is desired, the clay can be dried by conventional drying mechanisms, such as by spray drying. By such drying, the clay can be reduced to its dry particle state.

The blended clay material of the instant invention exhibits enhanced utility in the paper and printing business by minimizing the thixotropy of the clay material, while still maintaining fine particle size and high aspect ratio. Further, the abrasion characteristics of the clay particles are substantially reduced by the removal of the coarse ground impurities as well as by the removal of soluble salts. It is preferred that the measure of abrasion be no more than about 10 mg. when measured using an Einlehner Abrasion Tester.

EXAMPLES

This invention is illustrated by the following examples in a manner that does not restrict the scope of the present invention.

Example 1

A sample of crude sodium white bentonite from the state of Durango, in Mexico, was slurried in water at 12.3% solids and washed with deionized water using dialysis tubing until free of soluble salts. After removing the soluble salts, the slurry was diluted to 10.2% solids, then fractionated using an International centrifuge. The properties of the washed crude sodium bentonite are given in Table 1. The properties of the washed and fractionated sodium bentonite are given in Table 2.

TABLE 1

Crude Sodium White Bentonite from Mexico

| | |
|---|---|
| Impurities | Feldspar, Quartz, and Opal - CT |
| +325 Mesh Residue | 4.95% |
| C.E.C. | 61 meq/100 g |
| Solids | 10.2% |
| Brookfield Viscosity | 316 cPs |
| Hercules Viscosity | 1.3 dynes at 1100 rpm |
| Yield Point | 0.5 dynes |

Particle Size Distribution (+325 mesh)

| Microns | Cumulative % |
|---|---|
| 30 | 99.7 |
| 20 | 99.7 |
| 10 | 97.3 |
| 5 | 92.2 |
| 2 | 83.6 |
| 1 | 75.2 |
| 0.5 | 65.2 |
| 0.25 | 54.6 |
| Abrasion (−325 mesh) | 38.7 mg |

TABLE 2

Fractionated Sodium White Bentonite from Mexico

| | |
|---|---|
| Impurities | Opal - CT |
| +325 Mesh Residue | 0.00% |
| C.E.C. | 103 meq/100 g |
| Solids | 9.7% |
| Brookfield Viscosity | 10250 cPs |
| Hercules Viscosity | 4.9 dynes at 1100 rpm |
| Yield Point | 0.8 dynes |

Particle Size Distribution (−325 mesh)

| Microns | Cumulative % |
|---|---|
| 30 | 99.9 |
| 20 | 99.2 |
| 10 | 98.9 |
| 5 | 99.2 |
| 2 | 98.7 |
| 1 | 98.4 |
| 0.5 | 92.4 |

TABLE 2-continued

| | |
|---|---|
| 0.25 | 80.3 |
| Abrasion (−325 mesh) | 14 mg |

Example 2

A sample of crude calcium white bentonite from the state of Durango, in Mexico, was slurried in water at 21% solids and washed with deionized water using dialysis tubing free of soluble salts. After the removal of soluble salts the slurry was diluted to 17.5% solids then fractionated using an International centrifuge. The properties of the washed crude calcium bentonite are given in Table 3. The properties of the washed and fractionated calcium bentonite are given in Table 4.

TABLE 3

Crude Calcium White Bentonite from Mexico

| | |
|---|---|
| Impurities | Feldspar, Quartz, Calcite, Gypsum, and Opal - CT |
| +325 Mesh Residue | 5.5% |
| C.E.C. | 43 meq/100 g |
| Solids | 17.5% |
| Brookfield Viscosity | 20 cPs |
| Hercules Viscosity | 0.3 dynes at 1100 rpm |
| Yield Point | None |

Particle Size Distribution (−325 mesh)

| Microns | Cumulative % |
|---|---|
| 30 | 97.1 |
| 20 | 92.0 |
| 10 | 74.5 |
| 5 | 58.0 |
| 2 | 44.0 |
| 1 | 35.2 |
| 0.5 | 25.9 |
| 0.25 | 9.8 |
| Abrasion (−325 mesh) | 29.6 mg |

TABLE 4

Fractionated Calcium White Bentonite from Mexico

| | |
|---|---|
| Impurities | Opal - CT |
| +325 Mesh Residue | 0.00% |
| C.E.C. | 83 meq/100 g |
| Solids | 10.3% |
| Brookfield Viscosity | 220 cPs |
| Hercules Viscosity | 0.3 dynes at 1100 rpm |
| Yield Point | 0/0 dynes |

Particle Size Distribution (−325 mesh)

| Microns | Cumulative % |
|---|---|
| 30 | 99.9 |
| 20 | 99.3 |
| 10 | 99.3 |
| 5 | 99.6 |
| 2 | 98.7 |
| 1 | 95.1 |
| 0.5 | 87.1 |
| 0.25 | 77.5% |
| Abrasion | 6.5 mg |

The Effect of Fractionation on the abrasiveness of Sodium and Calcium Bentonite from Examples 1 and 2 is shown in Table 5.

TABLE 5

| Bentonite Type | Centrifuge Speed | Abrasion |
| --- | --- | --- |
| Sodium Bentonite | 0 rpm | 38.7 mg |
| Sodium Bentonite | 550 rpm | 15.7 mg |
| Sodium Bentonite | 1100 rpm | 7.4 mg |
| Sodium Bentonite | 1600 rpm | 4.1 mg |
| Calcium Bentonite | 0 rpm | 29.6 mg |
| Calcium Bentonite | 550 rpm | 10.1 mg |
| Calcium Bentonite | 1100 rpm | 4.5 mg |
| Calcium Bentonite | 1600 rpm | 3.8 mg |

The effect of removal of soluble salts on the viscosities of smectites is shown in Table 6.

TABLE 6

|  | Unrinsed Viscosity | Rinsed Viscosity |
| --- | --- | --- |
| Sodium Smectite | 400,000 cPs | 10250 cPs |
| Calcium Smectite | 825 cPs | 220 cPs |
| 50%/50% Blend | 8000 cPs | 245 cPs |

Examples 1 and 2 show the improvement of the clay by the removal of coarse grain impurities by fractionation using a centrifuge. These processes enrich the product in smectite content, cation exchange capacity and markedly reduce the abrasive nature of the crude bentonite.

Example 3

Various blends of sodium and calcium smectite from Examples 1 and 2 were prepared. Rheology and abrasion properties of the blends were then measured. Table 7 lists the blends and the appropriate data for each of the blends.

TABLE 7

Rheological properties of Calcium and Sodium Smectite Blends at 10% Solids

| Blends | Brookfield Viscosity 20 rpm | Hercules Viscosity 1100 rpm | Yield Point | Abrasion |
| --- | --- | --- | --- | --- |
| 100% Ca | 220 cPs | 0.3 dynes | 0.0 dynes | 6.2 mg |
| 80% Ca/20% Na | 20 cPs | 0.3 dynes | 0.0 dynes | 9.3 mg |
| 60% Ca/40% Na | 54 cPs | 0.7 dynes | 0.0 dynes | 8.8 mg |
| 50% Ca/50% Na | 245 cPs |  |  | 9.8 mg |
| 40% Ca/60% Na | 490 cPs | 1.6 dynes | 0.1 dynes | 10.5 mg |
| 20% Ca/80% Na | 4250 cPs | 3.2 dynes | 0.2 dynes | 9.5 mg |
| 100% Na | 10250 cPs | 4.9 dynes | 0.8 dynes | 10.5 mg |

By blending calcium and sodium smectites that have been degritted, washed free of soluble salts and fractionated to produce a consistent particle size, enhanced properties of the calcium/sodium smectite clay blends are achieved over non-blended smectite clay. Further, by blending the calcium and smectite clays it is possible to produce a product that has a lower viscosity than either the calcium or smectite clays when used individually. This permits higher solids content to be used in the coating for paper than currently is utilized.

I claim:

1. A process for the production of a blended clay slurry for use in the paper-coating industry comprising
    (a) slurrying a clay containing sodium smectite clay with water to form a sodium smectite clay slurry;
    (b) slurrying a clay containing calcium smectite clay with water to form a calcium smectite clay slurry;
    (c) degritting individually the clay slurries of (a) and (b) to remove substantially coarse grain impurities from the slurries;
    (d) removing a substantial portion of soluble salts from the clay slurries;
    (e) fractionating the clay slurries to produce smectite clay slurries with a distribution of particle sizes less than the distribution of particle sizes of the clay slurries prior to fractionation; and
    (f) blending together the sodium smectite clay slurry with the calcium smectite clay slurry to form a blended clay slurry.

2. The process of claim 1 wherein the sodium smectite clay slurry has a sodium smectite clay solid content from about 5 to about 50 percent.

3. The process of claim 1 wherein the calcium smectite clay slurry has a calcium smectite clay solid content from about 5 to about 50 percent.

4. The process of claim 1 wherein the blended clay slurry has a solid content of about 5 to about 50 percent calcium and sodium smectite clays.

5. The process of claim 1 wherein at least about 90 percent of the coarse grained impurities are removed from the clay slurries.

6. The process of claim 1 wherein at least about 70 percent of the soluble salts are removed from the calcium and sodium smectite clay slurries by fractionation.

7. The process of claim 1 wherein the particle size of the sodium smectite clay after removal of the undesirable soluble salts and after fractionation is at least about 90 percent<0.5 μm.

8. The process of claim 1 wherein the particle size of the calcium smectite clay after removal of the undesirable soluble salts and after fractionation is at least about 80 percent<0.5 μm, 9. The process of claim 1 wherein the blended clay slurry is comprised of at least about 10 percent sodium smectite clay based on a dry solid weight percentage of the sodium smectite clay.

10. The process of claim 1 wherein the blended clay slurry is comprised of at least about 40 percent calcium smectite clay based on a dry solid weight percentage of the calcium smectite clay.

11. The process of claim 1 wherein the blended clay slurry contains at least about 10 percent sodium smectite clay and at least about 40 percent calcium smectite clay on a dry solid weight percentage of the sodium and calcium smectite clay.

12. The process of claim 1 wherein the blended clay slurry has a viscosity at 20 rpm of no more than about 4,000 cps at 10 percent solids.

13. The process of claim 1 wherein the blended clay slurry has a viscosity at 1100 rpm of no more than about 4 dynes at 10 percent solids.

14. The process of claim 1 wherein the blended slurry has a measure of abrasion of no more than about 10 mg. when measured by an Einlehner Abrasion Tester.

* * * * *